US008995322B2

United States Patent
Huang et al.

(10) Patent No.: US 8,995,322 B2
(45) Date of Patent: *Mar. 31, 2015

(54) MULTI-TIERED DETECTION OF A GEOFENCE

(71) Applicant: Apple Inc., Cupertino, CA (US)

(72) Inventors: Ronald K. Huang, San Jose, CA (US); Morgan Grainger, Sunnyvale, CA (US); Jason Dere, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,543

(22) Filed: Jan. 27, 2014

(65) Prior Publication Data

US 2014/0141802 A1    May 22, 2014

Related U.S. Application Data

(63) Continuation of application No. 12/986,172, filed on Jan. 6, 2011, now Pat. No. 8,638,720.

(51) Int. Cl.

| | |
|---|---|
| *H04B 7/00* | (2006.01) |
| *H04W 4/02* | (2009.01) |
| *H04W 4/04* | (2009.01) |
| *H04W 84/04* | (2009.01) |
| *H04W 84/12* | (2009.01) |

(52) U.S. Cl.
CPC .............. *H04W 4/021* (2013.01); *H04W 4/043* (2013.01); *H04W 84/042* (2013.01); *H04W 84/12* (2013.01)
USPC ....................................................... 370/310.2

(58) Field of Classification Search
USPC ................................. 370/310–349
See application file for complete search history.

(56) References Cited

U.S. PATENT DOCUMENTS

| | | | |
|---|---|---|---|
| 6,957,076 B2 | 10/2005 | Hunzinger | |
| 7,305,244 B2 | 12/2007 | Blomqvist et al. | |
| 7,542,451 B2 | 6/2009 | Cooper et al. | |
| 7,595,754 B2 | 9/2009 | Mehta | |
| 2003/0148771 A1 | 8/2003 | de Verteuil | |
| 2004/0110503 A1 | 6/2004 | Park | |
| 2004/0235475 A1 | 11/2004 | Ishii | |
| 2005/0249171 A1 | 11/2005 | Buckley et al. | |
| 2006/0129317 A1* | 6/2006 | Farmer et al. ................. | 701/213 |
| 2008/0070588 A1* | 3/2008 | Morin ........................ | 455/456.1 |
| 2008/0102787 A1* | 5/2008 | Landschaft et al. ....... | 455/404.2 |
| 2008/0281510 A1* | 11/2008 | Shahine ........................ | 701/207 |
| 2010/0087194 A1 | 4/2010 | MacNaughtan et al. | |
| 2010/0265888 A1 | 10/2010 | Kim et al. | |
| 2011/0019649 A1 | 1/2011 | Dayal et al. | |

FOREIGN PATENT DOCUMENTS

WO    WO 2004/092762    10/2004

* cited by examiner

*Primary Examiner* — Kwang B Yao
*Assistant Examiner* — Juvena Loo
(74) *Attorney, Agent, or Firm* — Fish & Richardson P.C.

(57) ABSTRACT

Methods, program products, and systems for multi-tier detection of a geofence are disclosed. In general, in one aspect, a mobile device can be configured to perform a task when the mobile device enters a geographic region. The mobile device can monitor a current location using a multi-tiered approach. A baseband subsystem can monitor a coarse location of the mobile device using a CDMA system identifier, a CDMA network identifier, a CDMA zone identifier, or a CDMA base station identifier, in that order, as the mobile device moves closer to the geographic region. The baseband subsystem can notify an application subsystem when the mobile device is in a cell that intersects the geographic region. The application subsystem can perform the task upon notification.

21 Claims, 11 Drawing Sheets

```
600 ─┐
     ↓
┌─────────────────────────────────────────────────────────┐
│ Receiving a request from a mobile device to perform the task │
│                                                     602 │
└─────────────────────────────────────────────────────────┘
                            ↓
┌─────────────────────────────────────────────────────────┐
│      Associating a task with a geographic region        │
│                                                     604 │
└─────────────────────────────────────────────────────────┘
                            ↓
┌─────────────────────────────────────────────────────────┐
│ Determining a first code division multiple access (CDMA) identifier │
│               and a second CDMA identifier              │
│                                                     606 │
└─────────────────────────────────────────────────────────┘
                            ↓
┌─────────────────────────────────────────────────────────┐
│ Providing the first CDMA identifier and the second CDMA identifier │
│  to the mobile device for determining a condition to perform the task │
│                                                     608 │
└─────────────────────────────────────────────────────────┘
```

FIG. 6

MULTI-TIERED DETECTION OF A GEOFENCE

CROSS-REFERENCE TO RELATED APPLICATION

This application is a continuation of and claims priority to U.S. patent application Ser. No. 12/986,172, entitled "Multi-Tiered Detection of a Geofence," filed on Jan. 6, 2011, the entire contents of which are incorporated herein by reference.

TECHNICAL FIELD

This disclosure relates generally to location-based processing on a mobile device.

BACKGROUND

A modern mobile device can function as a computer and as a cellular telephone. For example, the mobile device can perform traditional computer functions, such as executing application programs, storing various data, and displaying digital images. These functions can be performed in an application subsystem of the mobile device. The application subsystem can include an application processor, an application operating system, and various input/output devices.

When the mobile device functions as a cellular telephone, the mobile device can initiate and receive phone calls, identify cellular tower connections, and determine when and whether to switch cellular towers. These functions can be performed in a baseband subsystem of the mobile device. The baseband subsystem can include a baseband processor and a baseband operating system. The baseband processor can be an integrated circuit (IC) device (e.g., a Large Scale Integrated Circuit (LSI)) that performs communication functions. The baseband processor can include, for example, a code division multiple access (CDMA) unit. The baseband processor can be integrated with the application processor in a System-on-Chip (SoC). In general, the application subsystem can consume more power than the baseband subsystem when activated.

SUMMARY

Methods, program products, and systems for multi-tiered detection of a geofence using CDMA data are disclosed. In general, in one aspect, a mobile device can be configured to perform a task when the mobile device enters a geographic region. The mobile device can monitor a current location using a multi-tiered approach. A baseband subsystem can monitor a coarse location of the mobile device using a CDMA system identifier, a CDMA network identifier, a CDMA zone identifier, or a CDMA base station identifier, in that order, as the mobile device moves closer to the geographic region. The baseband subsystem can notify an application subsystem when the mobile device is in a cell that intersects the geographic region. The application subsystem can perform the task upon notification.

In some implementations, the multi-tiered detection of a geofence can include, after determining a location of a mobile using CDMA identifiers, determining a finer-grained location using wireless access point triangulation. Upon determining that the mobile device is in a cell that intersects the geographic region, the baseband subsystem can transfer the monitoring to the application subsystem. The mobile device can determine that the mobile device enters the geographic region by triangulating locations of access points of a wireless local area network (WLAN) or by using position coordinates from a global positioning system (e.g., GPS). The task can be performed based on the determination that the cell intersects the geographic region.

In another aspect, the mobile device can be configured to detect whether the mobile device has crossed a geofence to enter a geographic region using multi-tiered detection. The mobile device can receive a request to perform a task. The request can specify that the task be performed when the mobile device is located in a predefined first geographic region. The first geographic region can be defined using a first location accuracy. The mobile device can monitor a current location of the mobile device using a second location accuracy. The second location accuracy initially can be less precise than the first location accuracy. The mobile device can determine that the mobile device is located in a second geographic region. The second geographic region can be specified using the second granularity and can include at least a portion of the first geographic region. The mobile device can refine the second location accuracy upon the determining that the mobile device is in the second geographic region. The mobile device can continue a cycle of monitoring, determining, and refining until an exit condition is satisfied. Upon determining that the mobile device is located in the first geographic region, the mobile device can perform the requested task.

The multi-tiered geofence detection techniques can be implemented to achieve the following exemplary advantages. Efficient power management can be achieved. Multi-tiered geofence detection can be achieved using coordination between a baseband subsystem and an application subsystem. The baseband subsystem can perform location monitoring until participation of the application subsystem is needed. On a mobile device, a baseband subsystem can consume less power than an application subsystem. Accordingly, the "as needed" approach allows the application subsystem to be set to a power-saving mode until the mobile device is sufficiently close to the geofence, thus conserving battery power.

The details of one or more implementations of multi-tiered geofence detection are set forth in the accompanying drawings and the description below. Other features, aspects, and advantages of multi-tiered geofence detection will become apparent from the description, the drawings, and the claims.

BRIEF DESCRIPTION OF THE DRAWINGS

FIG. 6 is a flowchart illustrating an exemplary process implementing multi-tiered geofence detection techniques.

Like reference symbols in the various drawings indicate like elements.

DETAILED DESCRIPTION

Overview of Multi-Tiered Geofence Detection

Figure 1:
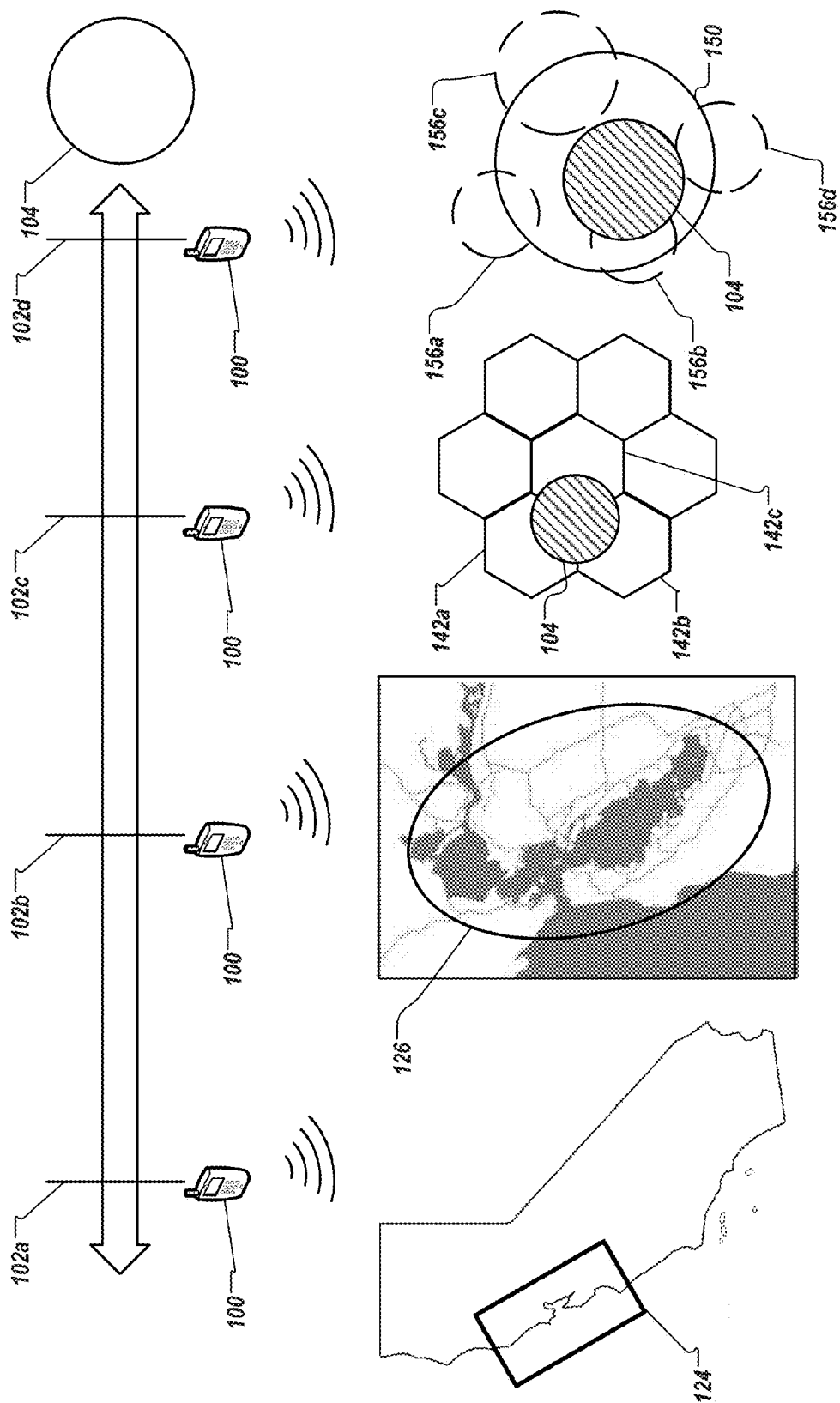
FIG. 1 is an overview of techniques of multi-tiered detection of a geofence using CDMA data.

FIG. 1 is an overview of techniques of multi-tiered detection of a geofence. Mobile device 100 can be an exemplary mobile device that implements the techniques of multi-tiered detection of a geofence. In FIG. 1, mobile device 100 is configured to perform one or more tasks when mobile device 100 is located in geographic region 104. Geographic region 104 can be defined using a geofence. The geofence can be a boundary configured on a server computer or on a mobile device (e.g., mobile device 100). The geofence can be a circle, a polygon, or any geographic shape that encloses geographic region 104. Geographic region 104 can correspond to, for example, an office, a floor of a building, a building, a block of buildings, a city, a state, etc. The task to be performed can include, for example, launching an application program, setting certain files to non-accessible mode, initiating a phone call, sounding an alarm, among others. For illustration, geographic region 104 is located inside the city of San Jose of San Francisco Bay Area, California, United States.

In the multi-tiered detection, Mobile device 100 can associate geographic region 104 with a set of one or more CDMA identifiers. Geographic region 104 can be associated with a system identifier, a network identifier, a zone identifier, and a base station identifier. The system identifier, network identifier, zone identifier, and base station identifier can correspond to a CDMA system, a portion of the CDMA system, a subset of the portion of the CDMA system, and a base station of the CDMA system, respectively. The cell served by the base station can intercept geographic region 104. Mobile device can store the CDMA identifiers in a storage device or request the CDMA identifiers from a server.

As mobile device 100 moves towards or away from geographic region 104 (at distances 102*a-d*), mobile device 100 can use various ways to determine whether mobile device 100 is located inside geographic region 104. The determination can use multi-tiered detection. When mobile device 100 is far away from geographic region, e.g., outside a coverage area of a CDMA system that covers geographic region 104, mobile device 100 can monitor a system identifier using a baseband subsystem, until mobile device 100 is inside the coverage area of the CDMA system that covers geographic region 104. The system identifier can include a system identification (SID) number that represents a CDMA system that includes a set of base stations.

To monitor the system identifier, mobile device 100 can register the system identifier associated with geographic region 104 at the baseband subsystem. For example, mobile device 100 can register a system identifier "31." System identifier "31" can correspond to geographic location 124. Geographic location 124 can be a coarse location that includes a geographic area that, approximately, encompasses Santa Rosa in the north and Salinas in the south, with San Francisco Bay Area in the middle.

At distance 102*a*, when mobile device is outside of geographic location 124, the baseband subsystem can receive CDMA identifiers including a system identifier from a CDMA system. When the system identifier indicates that mobile device 100 is outside of geographic location 124, mobile device 100 need not determine a current location at a finer granularity.

When mobile device 100 moves closer toward geographic region 104, mobile device 100 can use a more precise location determination mechanism to determine the current location of mobile device 100. When mobile device 100 moves into geographic location 124, for example, when mobile device 100 is at distance 102*b* from geographic region 104 and inside the coverage area of a CDMA system where the coverage area intersects geographic region 104, the baseband subsystem of mobile device 100 can determine that the current system identifier (e.g., "31") matches the registered system identifier. Mobile device 100 can switch to finer location monitoring, including monitoring a network identifier or a zone identifier using the baseband system.

In some implementations, the network identifier or zone identifier is registered with the baseband subsystem when mobile device 100 is configured to perform the task upon entering geographic area 104. In some implementations, the network identifier or zone identifier is registered with the baseband subsystem dynamically. The baseband subsystem can invoke or notify the application subsystem of mobile device 100 to request the network identifier or zone identifier. The application subsystem can provide to the baseband subsystem one or more network identifiers or zone identifiers of the CDMA system for registration. A network identifier can include a network identification (NID) number that identifies a portion of the CDMA system. The portion of the CDMA system can include a subset of base stations in a CDMA system. Each network identifier can be associated with a geographic location. The network identifier can be associated with a geographic location that has finer granularity than geographic location 124. For example, a network identifier can be associated with geographic location 126, which includes San Francisco Bay Area.

A zone identifier can identify a CDMA zone, which includes a subset of base stations in the portion CDMA network represented by a network identifier. Each zone identifier can be associated with a geographic location. The zone identifier can be associated with a geographic location that has finer granularity than geographic location 126. For example, a zone identifier can be associated with a city in the San Francisco Bay Area, e.g., San Jose.

Upon entering geographic location 124, the baseband subsystem of mobile device 100 can monitor the network identifier or zone identifier. Based on the network identifier, mobile device 100 can determine that mobile device 100 is located in geographic location 126 (San Francisco Bay Area). Upon entering geographic location 126 (at distances 102*b* from geographic region 104), the baseband subsystem of mobile device 100 can monitor the zone identifier. Based on the zone identifier, mobile device 100 can determine that mobile device 100 is located in San Jose of San Francisco Bay Area.

When mobile device 100 is located closer to geographic region 104 (e.g., at distance 102*c*, where mobile device 100 is inside a CDMA zone enclosing geographic area 104), location of mobile device 100 can be measured using finer granularity. In some applications, base station identifiers of base stations covering geographic area 104 are pre-registered at the baseband subsystem. In some implementations, upon determining that mobile device 100 is in San Jose where geographic region 104 is located, the baseband subsystem of mobile device 100 can request from the application subsystem a set of base station identifiers using the zone identifier. The application subsystem of mobile device 100 can request, from a remote server or from a data store on mobile device 100, one or more base station identifiers for base stations covering geographic region 104. Each base station identifier can include a base station identification (BSID) number that identifies a base station of the CDMA system. The application subsystem can provide to the baseband subsystem one or more base station identifiers that are associated with geographic locations that correspond to (e.g., intersect) geographic region 104. Geographic region 104 can intersect multiple cells (e.g., cell 142a, 142b, and 142c).

In some implementations, a server can send base station identifiers of base station serving cells intersecting geographic region 104 to mobile device 100. Mobile device 100 can register these base station identifiers with the baseband subsystem. The baseband subsystem can monitor in which cell mobile device 100 is currently located, using a current base station identifier of the CDMA system. When the baseband subsystem detects that the current base station identifier matches a base station identifier identifying a cell intersecting geographic region 104, the baseband subsystem can invoke the application subsystem and notify the application subsystem of the current base station identifier.

When mobile device 100 is close to geographic region 104 (at distances 102d, when mobile device 100 is inside a cell intercepting geographic region 104), triangulation of wireless access points can be used to determine the location of mobile device 100. The triangulation calculation can be executed by the application subsystem.

A cell of a cellular network can have a location accuracy measured in kilometers. The application subsystem can continue monitoring the current location of mobile device 100 with finer location accuracy. For example, the application subsystem can continue monitoring the current location of mobile device 100 using GPS. In some implementations, mobile device 100 can continue monitoring the current location by triangulation using WLAN access points. The WLAN can include a WiFi™, WiMax™, or Bluetooth™ network. To triangulate the current location of mobile device 100, mobile device 100 can request from a server (or query a database on mobile device 100) one or more identifiers (e.g., Media Access Control (MAC) addresses) of WLAN access points. The identifiers can be associated with geographic locations of the WLAN access points. Mobile device 100 can detect the MAC addresses of the WLAN access points located within a communication range of mobile device 100. Mobile device 100 can calculate current location 150 based on locations 156a-d of the WLAN access points. The application subsystem can perform the task associated with geographic region 104 when current location 150 intersects (e.g., completely or partially includes or is completely or partially included in) geographic region 104.

Exemplary Tiers of Multi-Tiered Detection of a Geofence

Figure 2:
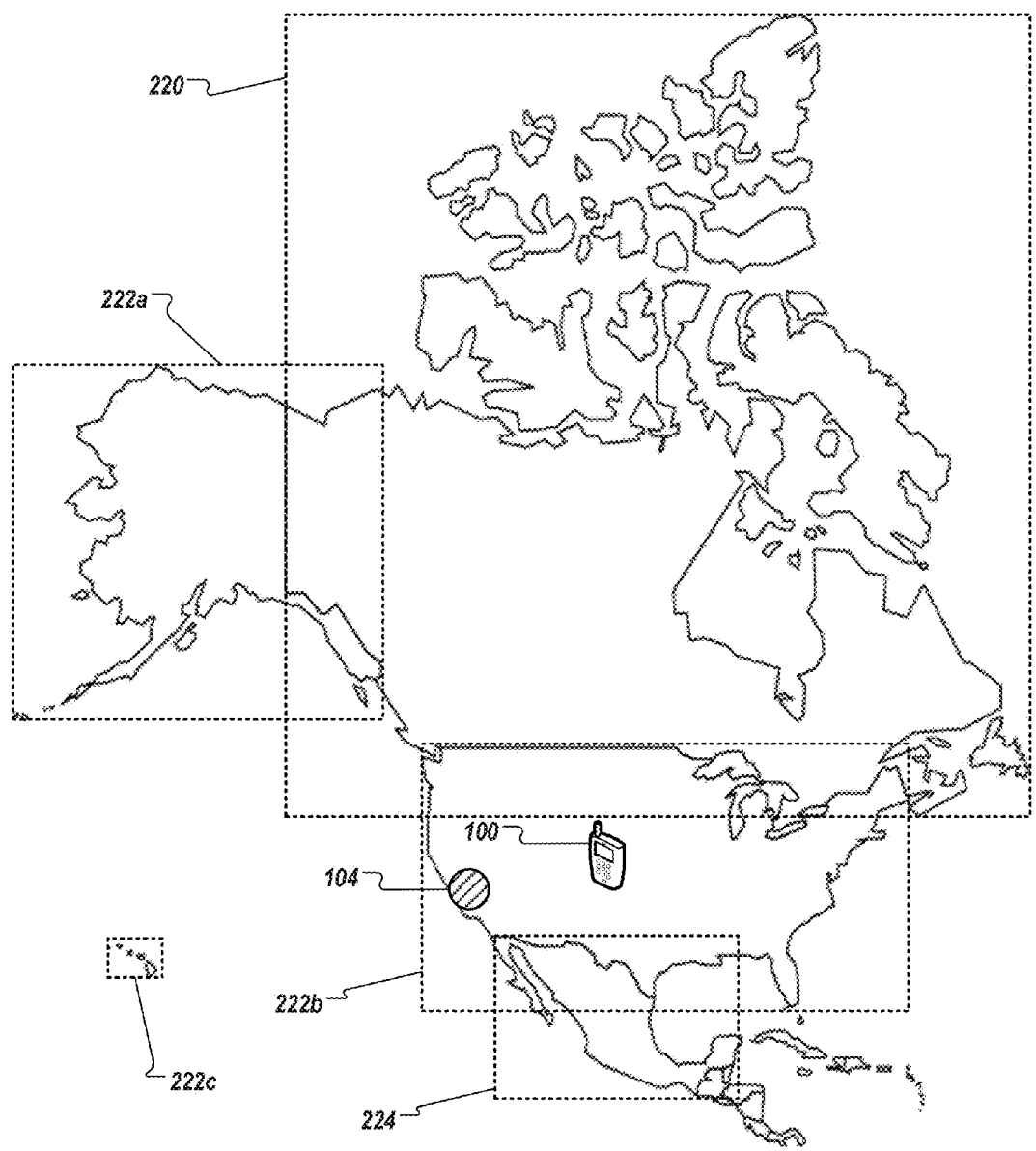
FIG. 2 is a map illustrating an exemplary tier of geofence detection where a mobile country code (MCC) is used to determine a coarse location of a mobile device.

FIG. 2 is a map illustrating an exemplary tier of geofence detection where MCC is used to determine a coarse location of mobile device 100. For convenience, only North America and Hawaiian Islands are shown in FIG. 2. Furthermore, only Canada, United States, and Mexico are given as examples for coarse location determination using MCC. The techniques of location filtering using MCC is applicable to other countries and continents.

Mobile device 100 can detect, using a baseband subsystem, a current MCC of mobile device 100. The current MCC of mobile device 100 can be obtained from a baseband subsystem, which can include a specialized processor that is responsible for wireless communications and control. An MCC is a code that the International Telecommunication Union (ITU) assigned to a country. The MCC is unique for each country and can be used to identify the country. Each country can have one or more MCCs assigned to it. Table 1 illustrates some example MCCs and corresponding countries of FIG. 2.

TABLE 1

| Exemplary MCCs | |
|---|---|
| MCC | Country |
| 302 | Canada |
| 310-316 | United States of America |
| 334 | Mexico |

To determine whether geographic region 104 is associated with a particular MCC, a system can generate polygons that are bounding boxes of the country of each MCC and determine whether geographic region 104 intersects the polygon or polygons of the MCC. For example, bounding box 220 can correspond to MCC "302" (Canada). Bounding boxes 222a-c can correspond to MCCs "310," "311," "312," "313," "314," "315," and "316" (United States). Bounding box 224 can correspond to MCC "334" (Mexico). For simplicity, bounding boxes for other North American countries are not shown in FIG. 1. A system (either mobile device 100, or a server device connected to mobile device 100 through a communications network, or both) can determine which MCC is to be associated with geographic region 104. For example, geographic region 104 can have a center with latitude and longitude coordinates 37° 47' 27.56" N and 122° 24' 08.69" W, indicating that geographic region 104 is located at 300 Bush Street, San Francisco, Calif., U.S.A. This location is inside bounding box 222b for the United States. Therefore, geographic region 104 can be associated with MCCs "310," "311," "312," "313," "314," "315," and "316."

The system can use various algorithms to determine a bounding box (e.g., bounding box 220) of a country associated with an MCC. A country (e.g., Canada) can be represented as one or more simple polygons whose vertices can be stored in latitude and longitude coordinates. The bounding box of a country can be a convex hull of the simple polygon of the country determined by, for example, Akl-Toussaint heuristics or Melkman's Algorithm. In some implementations, a bounding box of a country can be determined by extreme points within the boundaries of the country (e.g., easternmost, westernmost, northernmost, and southernmost points). The bounding box can be a substantially rectangular area on a map drawn using Mercator projection. The bounding box can be stored using latitude/longitude coordinates of two points (e.g., its north-west vertex and its southeast vertex).

For example, bounding box 220 enclosing Canada can have a northern boundary that is delineated by latitude 83° 08' N, corresponding to the latitude of Cape Columbia, Ellesmere Island, Nunavut, an extreme north point within the Canadian boundary. Bounding box 220 can have a southern boundary delineated by latitude 41° 41' N, corresponding to the latitude of Middle Island, Ontario, an extreme southern point of Canada. Bounding box 220 can have an eastern boundary delineated by longitude 52° 37' W (Cape Spear, Newfoundland), and a western boundary delineated by longitude 141°

00' W (Yukon-Alaska border). Bounding box 220 can be stored in two sets of coordinates (e.g., 83° 08' N/141° 00' W and 41° 41' N/52° 37' W).

Some countries (e.g., the United States) can be represented as multiple simple polygons (e.g., Alaska, 48 continental states, and Hawaii). Countries that can be represented using multiple simple polygons can have multiple bounding boxes (e.g., bounding boxes 222a for Alaska, bounding box 222b for continental 48 states, and bounding box 222c for Hawaii). Bounding boxes of various countries can overlap, as shown in the overlapping areas between bounding boxes 220 and 222a, for example.

Bounding boxes can be stored on mobile device 100 in association with MCCs, or on a server. For example, mobile device 100 can store, or be connected to, a geographic database, in which MCCs and corresponding bounding boxes are stored. MCC "302" (Canada) can be associated with the north-west vertex and southeast vertex of bounding box 220, for instance.

When mobile device 100 determines that mobile device 100 is in a particular country, mobile device 100 can retrieve or CDMA identifiers (e.g., system identifiers) corresponding to that country. Retrieving CDMA identifiers for a country can be utilized to avoid system identifier conflicts. For example, a system identifier 13 may correspond to a first geographic region in the United States (portions of Maryland, Washington D.C., and Virginia) and a second geographic region in China (Hong Kong).

Figure 3:
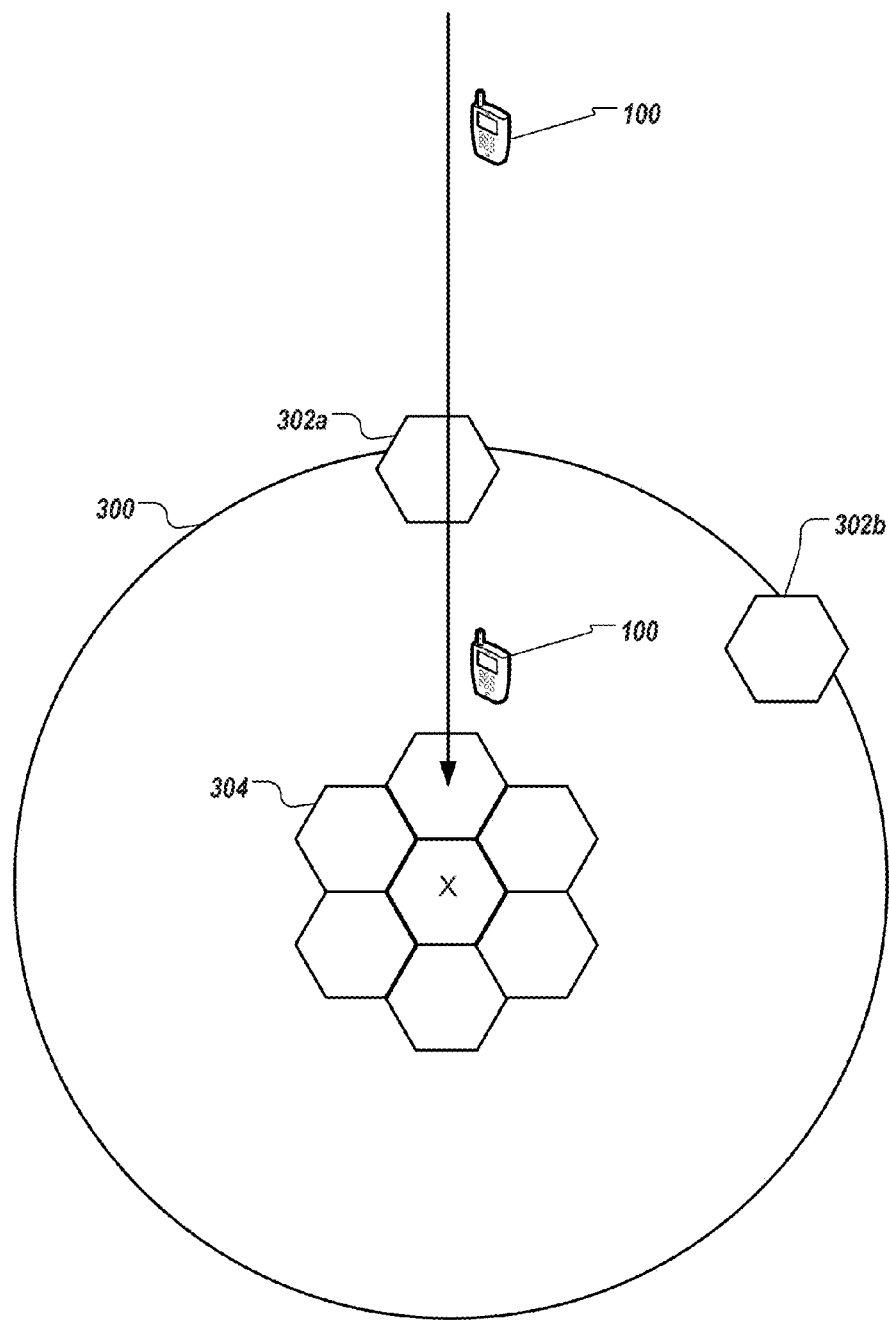
FIG. 3 is a diagram illustrating an exemplary tier of geofence detection where a mobile device is configured to monitor multiple base stations of a CDMA network.

FIG. 3 is a diagram illustrating an exemplary tier of geofence detection where mobile device 100 is configured to monitor multiple base stations of a CDMA system. Mobile device 100 can be configured to perform certain tasks when mobile device is located in geographic region 300. Geographic region 300 can be sufficiently large such that geographic region 300 is associated with multiple cells (e.g., cells 302a-b and 304). Each cell can correspond to a base station. Due to memory limitations of the baseband subsystem of mobile device 100, not all base stations can be registered with the baseband subsystem of mobile device 100.

Mobile device 100 can select a subset of cells to register when the memory limitation prevents mobile device 100 from registering all cells. In some implementations, a cell can be selected based on distances between the cell and a center of geographic region 300. The cells can be sorted based on a distance between each of the cells and the center (marked as an "X" in FIG. 3) of geographic region 300. The distance between a cell (e.g., cell 304) and the center can be measured using a distance between an estimated location of the cell and the center. The estimated location of the cell can be determined by, for example, an average of locations of location-aware mobile devices when the location-aware mobile devices are connected to the cell. The estimated position can coincide with the actual geographic location of the base station of the cell. The cell can also have an estimated size, which can be determined mathematically by a distribution of the locations of the location-aware mobile devices.

Mobile device 100 can register base station identifiers of cells that are closest to the center of geographic region 300. Cells that are far away from the center (e.g., cells 302a and 302b) can be excluded. Thus, when mobile device 100 moves toward geographic region 300, the baseband subsystem of mobile device 100 can ignore cells 302a and 302b. The baseband subsystem of mobile device 100 can notify the application subsystem of mobile device 100 when mobile device 100 enters one of the cells (e.g., cell 304) that is close to the center of geographic region 300.

Figure 4:
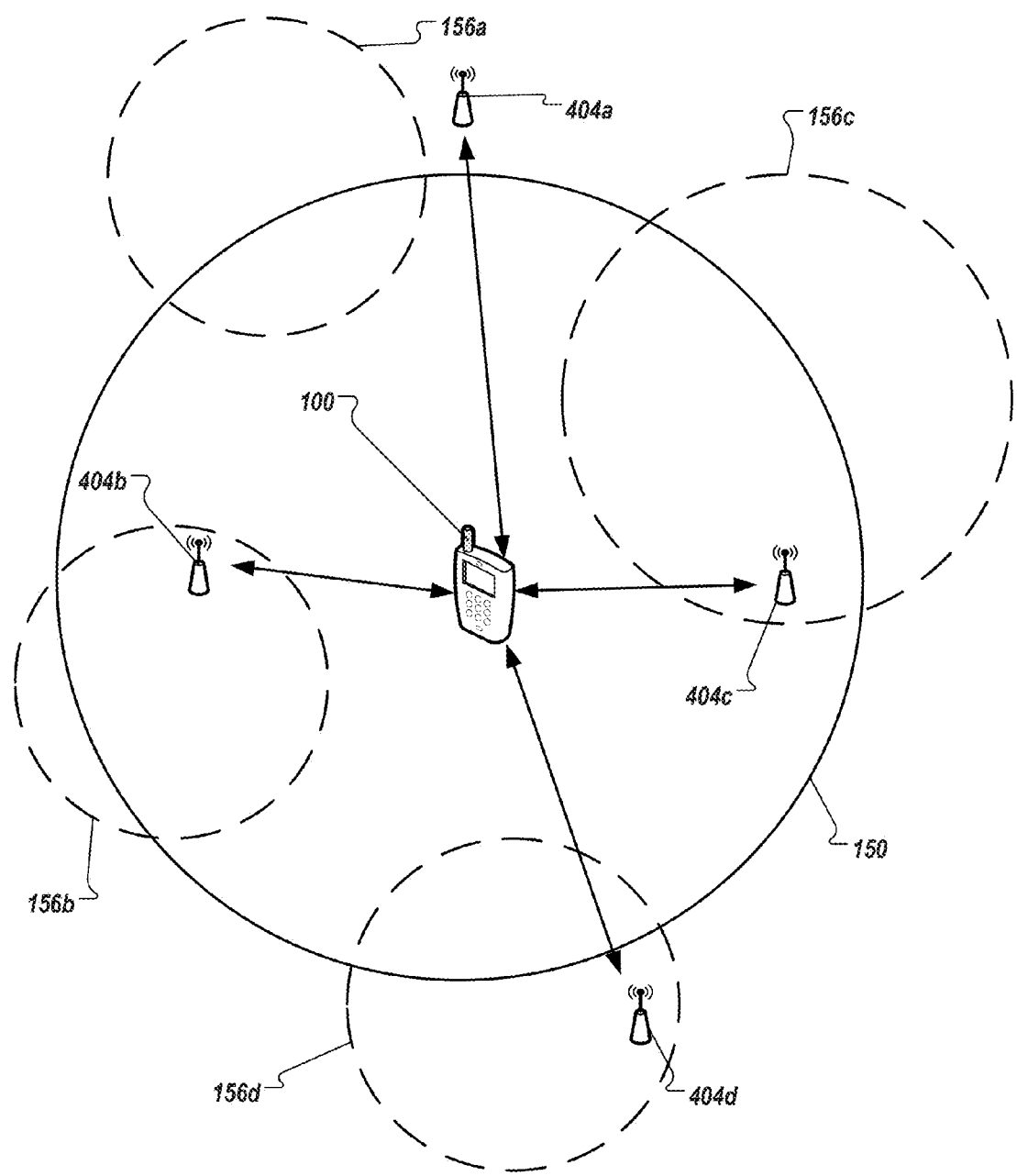
FIG. 4 is a diagram illustrating an exemplary tier of geofence detection where access points of a wireless local area network (WLAN) are used to determine a current location of a mobile device.

FIG. 4 is a diagram illustrating an exemplary tier of geofence detection where access points of a wireless local area network (WLAN) are used to determine a current location of mobile device 100. The exemplary tier of geofence detection of FIG. 4 can be performed by an application subsystem of mobile device 100.

Mobile device 100 can be located within communication range of access points 404a-d. Mobile device 100 can be connected to one of the access points 404a-d (e.g., 404a). From access point 404a, mobile device 100 can receive data that includes information on the locations (including locations 156a-d) of access points 404a-d. Mobile device 100 can store the received data on a storage device (e.g., a flash memory device) coupled to mobile device 100. The stored data can be updated periodically.

Mobile devices 100 can identify access points 404a, 404b, 404c, and 404d under wireless communication protocols used in the WLAN (e.g., IEEE 802.11x). Access points 404a, 404b, 404c, and 404d can be identified by MAC addresses of the access points or other identifiers (e.g., Bluetooth™ identifiers).

Mobile device 100 can identify locations 156a-d that are associated with access points 404a-d, respectively. Identifying locations 156a-d can include retrieving information on the locations 156a-d from the memory device coupled to mobile device 100. In some implementations, mobile device 100 can request from a server the locations 156a-d by querying the server using identifiers of access points 404a-d. Locations 156a-d need not be the actual, physical locations of access points 404a-d. Locations 156a-d can be areas that are determined by the server to be areas where mobile devices that are connected to access points 404a-d are most likely to be present.

Based on locations 156a-d, mobile device 100 can execute an iterative process (e.g., a multi-pass analysis). The iterative process can calculate an average locations 156a-d, select a subset of locations 156a-d that are closest to the average, and calculate the average again, and so on, until a desired precision is reached or until only a certain number of locations 156a-d are left. The iterative process can produce current location 150, which can be an estimate of the current geographic location of mobile device 100. Current location 150 can be a geographic space (e.g., a particular floor in a building) when three-dimensional location information is utilized. Mobile device 100 can perform a task associated with geographic region 104 when current location 150 intersects geographic region 104.

Exemplary System Implementing Multi-Tiered Detection of a Geofence

Figure 5:
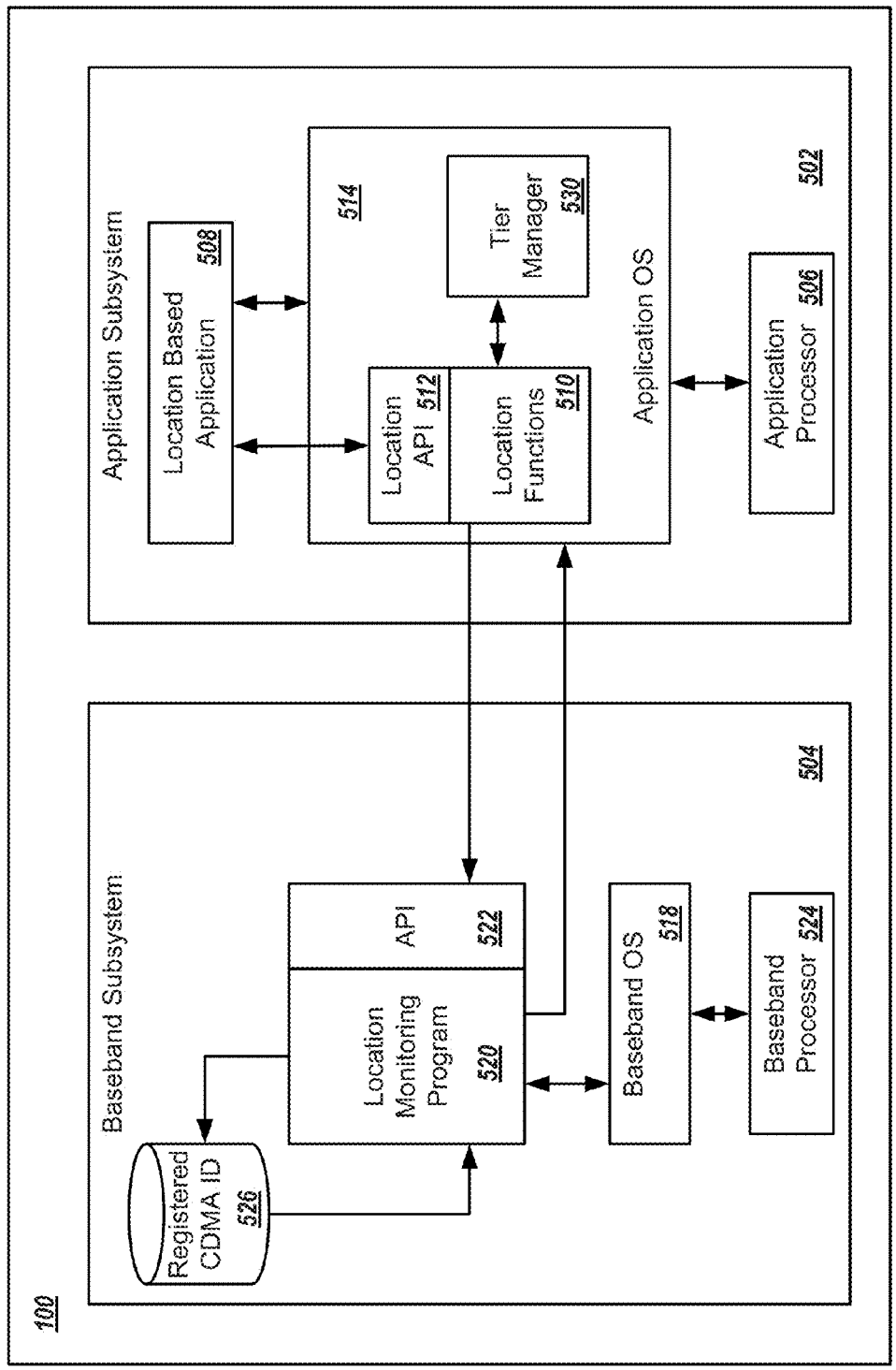
FIG. 5 is a block diagram illustrating various modules of a mobile device configured to utilize techniques of multi-tiered geofence detection.

FIG. 5 is a block diagram illustrating various modules of mobile device 100 configured to utilize techniques of multi-tiered geofence detection. Mobile device 100 can be, for example, a handheld computer, a personal digital assistant, a cellular telephone, an electronic tablet, a network appliance, a camera, a smart phone, a CDMA mobile phone, a network base station, a media player, a navigation device, an email device, a game console, or a combination of any two or more of these data processing devices or other data processing devices.

Mobile device 100 can include, among other components, application subsystem 502 and baseband subsystem 504. Application subsystem 502 can include application operating system 514, and application processor 506. One or more application programs 508 can execute in application subsystem 502. Application programs 508 can be location-based (e.g., configured to be invoked or notified when mobile device 100 is at or near a geographic region). Application operating system 514 can include various location functions 510. Location functions 510 can include, for example, functions that can retrieve current geographic location from a GPS receiver, and functions for communicating with baseband subsystem 504. Location functions 510 can be exposed to application programs 508 through location API 512. Location API 512 can have a public interface that allows development of "crowdware." Crowdware can include user-generated software (e.g., miniature application programs or widgets) that can be invoked when mobile device 100 is located in a particular geographic region (e.g., geographic region 104).

Location functions 510 can communicate with location monitoring program 520 of baseband subsystem 504. In some implementations, location-monitoring program 520 can be exposed to location functions 510 through API 522. Baseband subsystem 504 can include baseband operating system 518 and baseband processor 524.

Location functions 510 can register various CDMA identifiers with location monitoring program 520. The CDMA identifiers can include system identifiers, network identifiers, zone identifiers, base station identifiers, or other identifiers of wireless access gateways. The location identifiers can be stored in registered CDMA identifier data store 526. Location monitoring program 520 can monitor a current wireless access gateway. Monitoring the current wireless access gateway can include monitoring a current system identifier, network identifier, zone identifier, base station identifiers, or other identifiers of wireless access gateways using the baseband operating system 518 and baseband processor 524 of mobile device 100. Upon receiving information on the wireless access gateway, location-monitoring program 520 can compare the received information with the location identifiers in data store 526. If a match is found, location-monitoring program 520 can pass the matched identifier to application operating system 514 of the application subsystem 502.

Application operating system 514 can determine a next action based the received CDMA identifier, using tier manager 530. Tier manager 530 can determine whether the received CDMA identifier requires more granular monitoring, or is sufficient to trigger an invocation or notification of location based application program 508. For example, if location based application program 508 is associated with a geographic region that has location accuracy at cell level, and the identifier received from baseband subsystem corresponds to the geographic region, tier manager 530 can inform location functions 510 that location based application program 508 can be invoked or notified.

If the received CDMA identifier is a higher-level identifier (e.g., a system identifier or network identifier) that identifies a geographic region that has a coarse granularity, tier manager 530 can determine that finer granulated monitoring is necessary. Tier manager 530 can re-register with baseband subsystem 504 using the CDMA identifier of a next tier. For example, when location-monitoring program 520 identifies a matching system identifier, tier manager 530 can provide network identifiers system for monitoring. The one or more network identifiers can identify CDMA base station groups that cover geographic areas that intersect the geographic region associated with location based application program 508.

Exemplary Processes of Multi-Tiered Geofence Detection

FIG. 6 is flowcharts illustrating exemplary process 600 implementing multi-tiered geofence detection techniques. A computer (e.g., a server) can receive (602) a request from a mobile device to perform the task. The request can specify that the task shall be performed when the mobile device is located in a geographic region. The task can be launching an application program (e.g., application program 508) when a mobile device connected to the computer enters the geographic region, or receiving a service from the computer when the mobile device enters the geographic region. The geographic region can be a pre-define region (e.g., "Great America Theme Park") or a user drawn region. The geographic region can be a circular area having a center and a radius, or an arbitrary geometric shape. The geographic region can be defined by one or more sets of latitude-longitude coordinates. In some implementations, the geographic region can be a space (e.g., a particular floor of a building, a flight path of an aircraft, or a particular section of a ski area), further defined by one or more altitude parameters.

The computer can associate (604) the task with the geographic region. The computer can determine (606) a first CDMA identifier and a second CDMA identifier. The first CDMA identifier can correspond to a first geographic location. The second CDMA identifier can correspond to a second geographic location. The second geographic location can be inside the first geographic location. The geographic region associated with the task can be inside the second geographic location. Determining the first CDMA identifier and second CDMA identifier can include acquiring the first CDMA identifier and second CDMA identifier from multiple location-aware mobile device. The location-aware mobile devices can transmit to the computer locations in association with the first CDMA identifier and second CDMA identifier.

The computer can provide (608) the first CDMA identifier and the second CDMA identifier to the mobile device for determining a condition to perform the task as a response to the request. In some implementations, the first CDMA identifier and the second CDMA identifier can be provided to the mobile device in a tiered manner.

In some implementations, baseband subsystem 504 of mobile device 100 can be configured to notify application subsystem 502 when mobile device 100 leaves the second geographic location.

Figure 7:
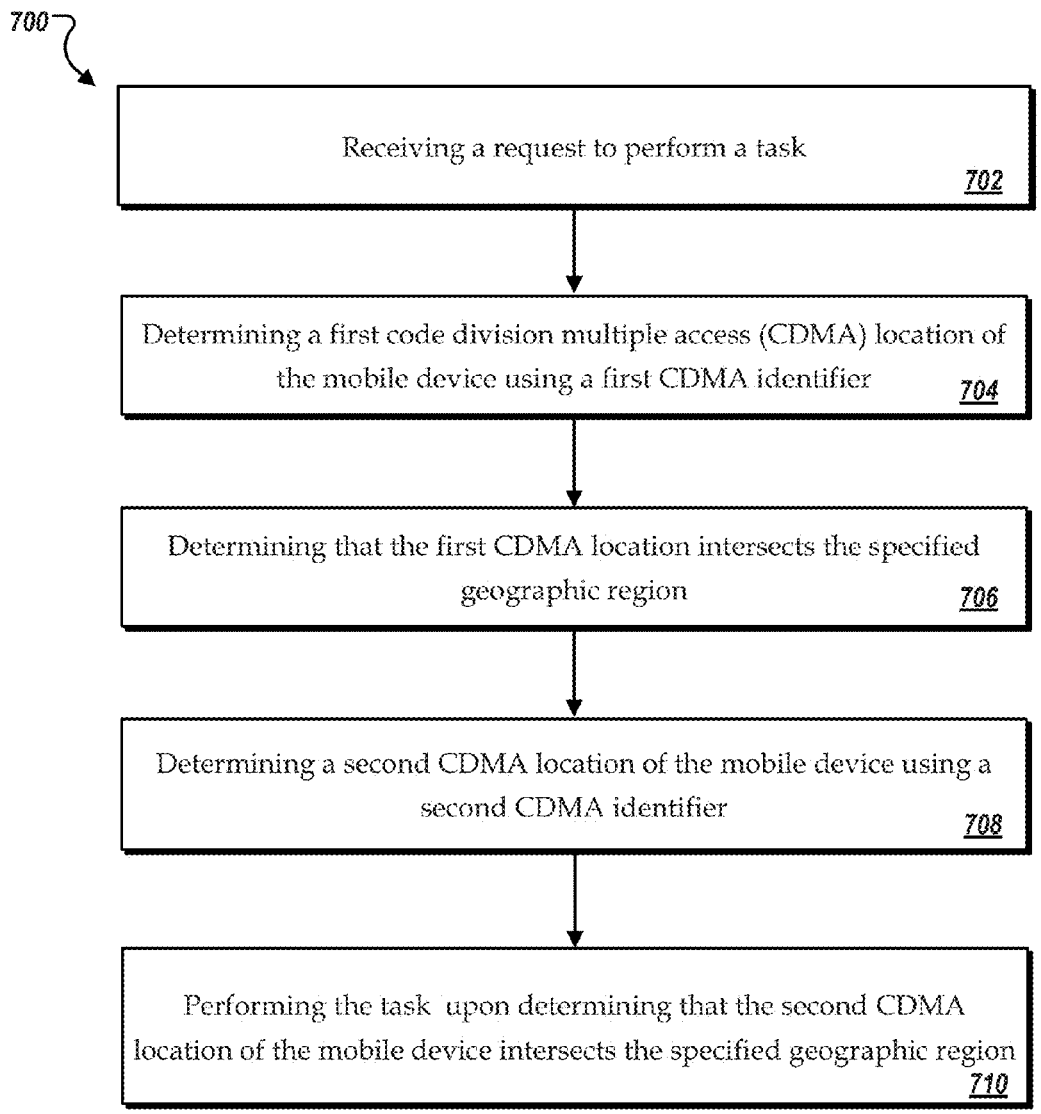
FIG. 7 is a flowchart illustrating another exemplary process implementing multi-tiered geofence detection techniques.

FIG. 7 is flowcharts illustrating exemplary process 700 implementing multi-tiered geofence detection techniques. For convenience, exemplary process 700 will be described with respect to mobile device 100 as described in reference to FIGS. 1-5.

Mobile device 100 can receive (702) a request to perform a task. The request can specify that mobile device 100 shall perform the task when mobile device 100 is located in a specified geographic region. The request can be associated with an application program (e.g., location based application program 508) that is downloaded from a server, copied from a storage device connected to mobile device 100, or created on mobile device 100. The geographic region can be configured on mobile device 100, or on the server from which the application program is downloaded.

Mobile device 100 can determine (704) a first CDMA location of mobile device 100 using a first CDMA identifier. The first CDMA identifier can be associated with the first CDMA location. Determining the first CDMA location of mobile device 100 using the first CDMA identifier can include determining the first CDMA location of mobile device 100 using a system identifier, a network identifier, or a zone identifier of a CDMA system.

In some implementations, before determining the first CDMA location of mobile device 100, mobile device 100 can determine that a current country of mobile device 100 intersects the geographic region. Determining that the current country of mobile device 100 intersects the geographic region can include determining that the geographic region intersects one or more polygons corresponding to the current country. Additionally or alternatively, determining that the current country of mobile device 100 intersects the geographic region can include identifying a match between a current MCC and an MCC associated with the geographic region.

Mobile device 100 can determine (706) that the first CDMA location intersects the specified geographic region. Determining that the current cell intersects the geographic region can include comparing the first CDMA identifier with one or more registered CDMA identifiers. The registered CDMA identifiers can be associated with the geographic region. Geographic coordinates and area of the first CDMA location can be determined based on historical usage data. For example, the coordinates and area of the first CDMA location can be determined using locations of location-aware mobile devices that are connected to base stations represented by the first CDMA identifier. The coordinates and area of the first CDMA location can by dynamic, varying by time of day or day of week.

Upon determining that the first CDMA location intersects the specified geographic region, mobile device 100 can determine (708) a second CDMA location of mobile device 100 using a second CDMA identifier. The second CDMA identifier can be associated with the second CDMA location. The second CDMA location can have finer granularity than that of the first CDMA location. Determining the second CDMA location of mobile device 100 using the second CDMA identifier can include determining the second CDMA location of mobile device 100 using a base station identifier of the CDMA system. In some implementations, determining the first CDMA location and the second CDMA location can include determining the first CDMA location and the second CDMA location using a baseband subsystem of mobile device 100.

Mobile device 100 can perform (710) the task upon determining that the second CDMA location of mobile device 100 intersects the specified geographic region. Performing the task can include invoking or notifying an application program (e.g., location-based application program 508) in application subsystem 502 from baseband subsystem 504. Likewise, in some implementations, mobile device 100 can perform a task when mobile device leaves a geographic region, a cell, a location area, or a country.

In some implementations, performing the task can include determining a current location of mobile device 100, including invoking an application program that triangulates the current location based on locations of one or more wireless access gateways. The application program that performs the triangulation can execute in application subsystem 502 of mobile device 100. The wireless access gateways can include wireless access points of a wireless local area network. Additionally or alternatively, determining the current location can include determining the current location using a global positioning system (GPS). Determining the current location using GPS can be performed in application subsystem 502 of mobile device 100.

Figure 8:
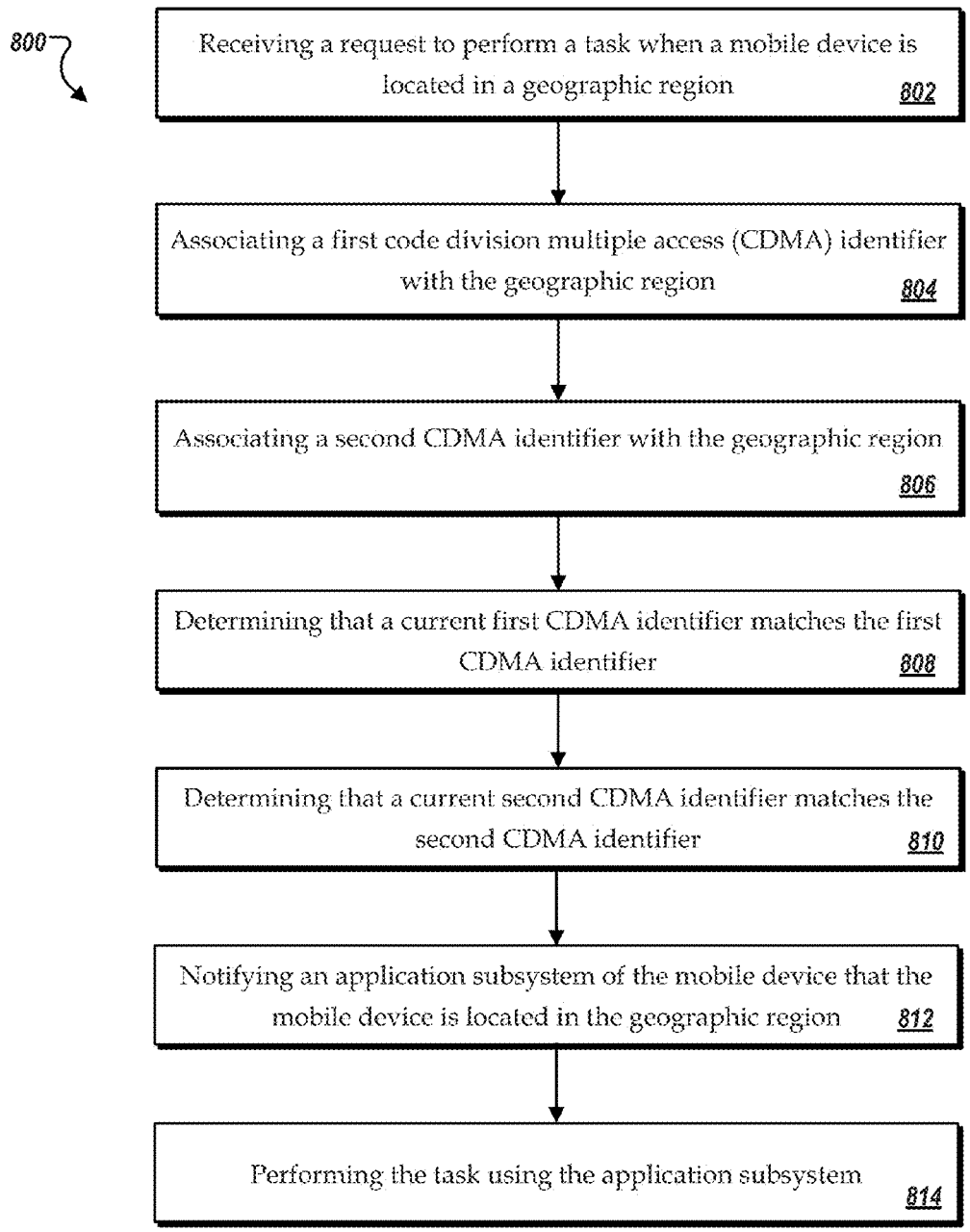
FIG. 8 is a flowchart illustrating an exemplary process of multi-tiered geofence detection using various granularities.

FIG. 8 is a flowchart illustrating exemplary process 800 of multi-tiered geofence detection using various location accuracies. A mobile device (e.g., mobile device 100 as described in reference to FIG. 1) can receive (802) a request to perform a task, the request specifying that the task be performed when the mobile device is located in a geographic region. The first geographic region can be a pre-defined geographic region or a user-drawn geographic region.

The mobile device can associating (804) a first CDMA identifier with the geographic region. The first CDMA identifier can correspond to at least a portion of a CDMA system that covers the geographic region. The first CDMA identifier can include at least one of a system identifier, a network identifier, or a zone identifier. In some implementations, associating the first CDMA identifier with the geographic region includes registering at least one of the system identifier, network identifier, or zone identifier with a baseband subsystem.

The mobile device can associate (806) a second CDMA identifier with the geographic region. The second CDMA identifier can correspond to a subset of the portion of the CDMA system of the first CDMA identifier. The subset of the portion of the CDMA system can cover the geographic region. The second CDMA identifier can include a base station identifier. In some implementations, associating the second CDMA identifier with the geographic region includes, after determining that the current first CDMA identifier matches the system identifier, network identifier, or zone identifier, registering the base station identifier with the baseband subsystem.

Using the baseband subsystem of the mobile device, the mobile device can determine (808) that a current first CDMA identifier matches the first CDMA identifier. The mobile device can receive the current first CDMA identifier from the CDMA system. The mobile device can determine that the mobile device is in a geographic area that generally covers the geographic region.

Upon determining that the current first CDMA identifier matches the first CDMA identifier, the mobile device can determine (810), using the baseband subsystem, that a current second CDMA identifier matches the second CDMA identifier. The mobile device can determine, with finer granularity than using the first CDMA identifier, that the mobile device is in a geographic area that covers the geographic region.

Upon determining that the current second CDMA identifier matches the second CDMA identifier, the mobile device can notify (812) an application subsystem of the mobile device that the mobile device is located in the geographic region.

The mobile device can perform (814) the task using the application subsystem. In some implementations, performing the task can include determining that the mobile device is inside the geographic region using finer-grained operations (e.g., by using a GPS signal) before launching an application program or requesting a service from a server.

In some implementations, when the mobile device moves away from the graphic region, the mobile device can monitor a current location using coarser-grained operations and stop monitoring the current location using finer-grained operations. The mobile device can de-registering the base station identifier with the baseband subsystem upon determining that the current first CDMA identifier no longer matches the first CDMA identifier.

Exemplary Mobile Device Architecture

Figure 9:
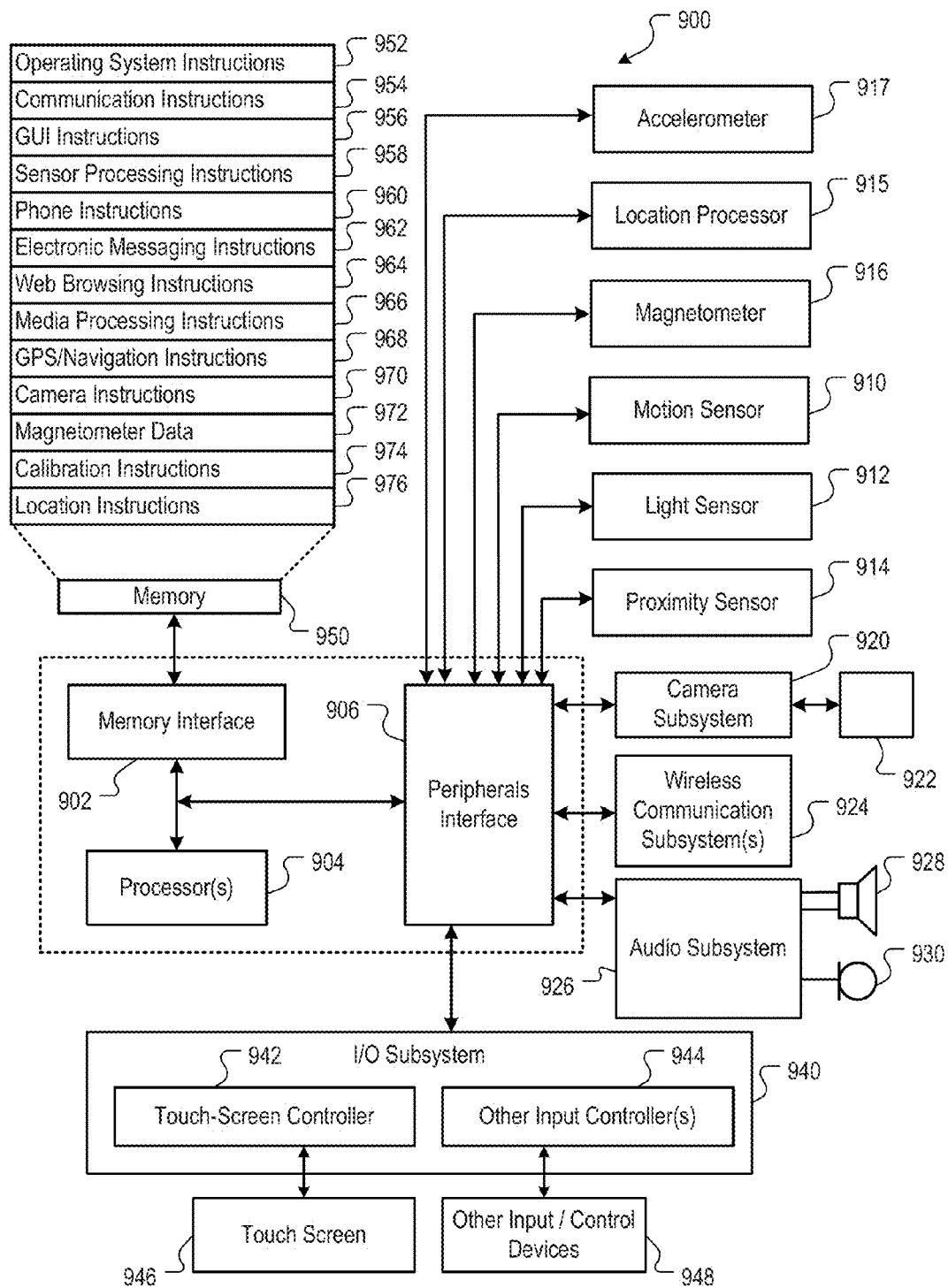
FIG. 9 is a block diagram illustrating an exemplary device architecture of a mobile device implementing the features and operations of multi-tiered geofence detection.

FIG. 9 is a block diagram of exemplary architecture 900 for the mobile devices of FIGS. 1-8. A mobile device can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include one or more application processors (APs) and one or more baseband processors (BPs). The application processors and baseband processors can be integrated in one single process chip. The various components in mobile device 100, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a CDMA system, a WiFi™ or WiMax™ network, and a Bluetooth™ network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to mobile device 100 on or off. The user may be able to customize a functionality of one or more of the buttons. The touch screen 946 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player, such as an iPod™. Mobile device 100 may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can include location instructions 976. Location instructions 976 can be a computer program product that is configured to cause the mobile device to perform tiered geofence detection using CDMA data.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
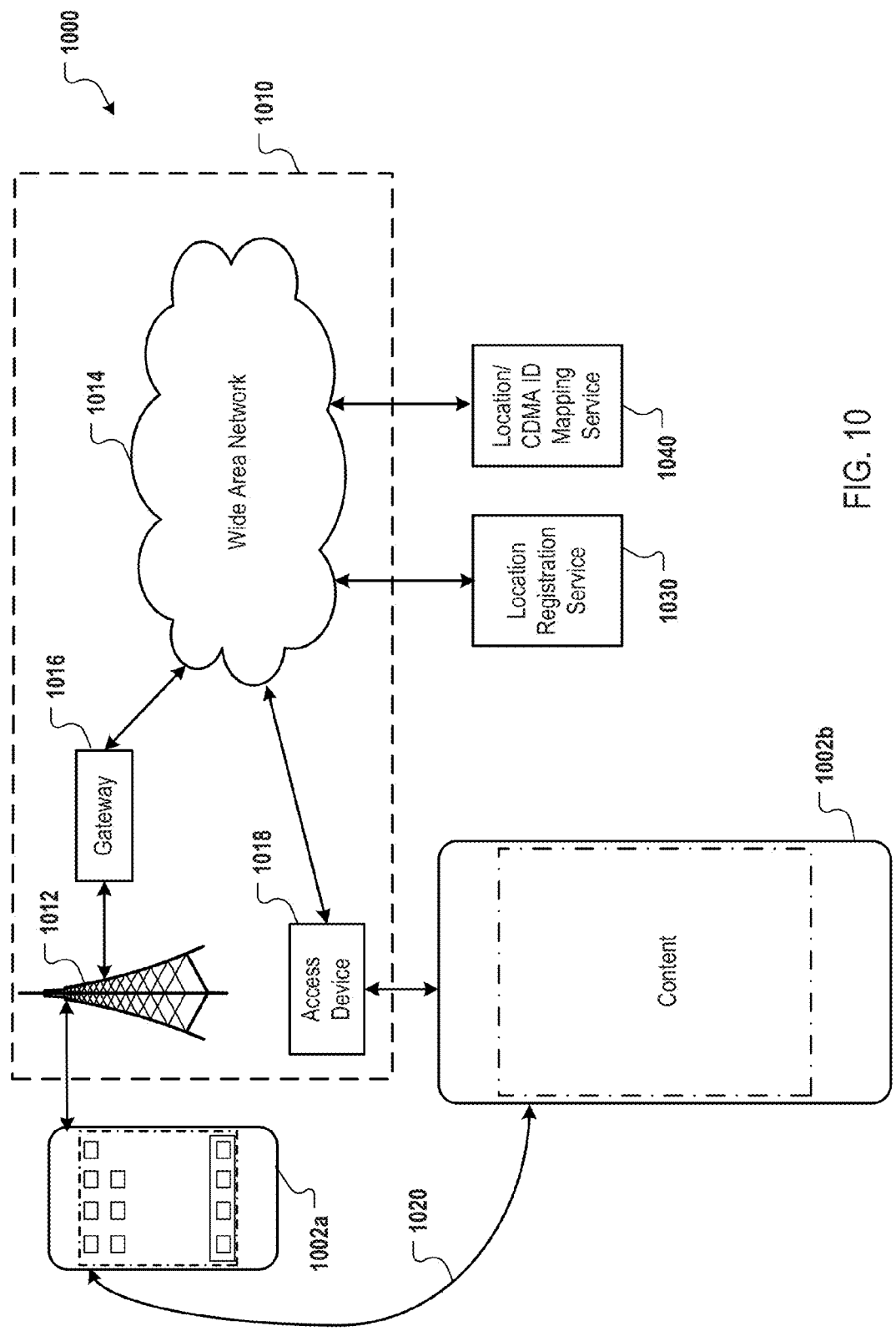
FIG. 10 is a block diagram of an exemplary network operating environment for the mobile devices of FIGS. 1-9.

FIG. 10 is a block diagram of exemplary network operating environment 1000 for the mobile devices of FIGS. 1-9. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access device, can provide communication access to the wide area network 1014.

In some implementations, both voice and data communications can be established over wireless network 1012 and the access device 1018. For example, mobile device 1002*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002*b* can place and receive phone calls, send and receive e-mail messages, and retrieve electronic documents over the access device 1018 and the wide area network 1014. In some implementations, mobile device 1002*a* or 1002*b* can be physically connected to the access device 1018 using one or more cables and the access device 1018 can be a personal computer. In this configuration, mobile device 1002*a* or 1002*b* can be referred to as a "tethered" device.

Mobile devices 1002*a* and 1002*b* can also establish communications by other means. For example, wireless device 1002*a* can communicate with other wireless devices, e.g., other mobile devices 1002*a* or 1002*b*, cell phones, etc., over the wireless network 1012. Likewise, mobile devices 1002*a* and 1002*b* can establish peer-to-peer communications 1020, e.g., a personal area network, by use of one or more communication subsystems, such as the Bluetooth™ communication devices. Other communication protocols and topologies can also be implemented.

The mobile device 1002*a* or 1002*b* can, for example, communicate with one or more services 1030 and 1040 over the one or more wired and/or wireless networks. For example, one or more location registration services 1030 can be used to associate application programs with geographic regions. The application programs that have been associated with one or more geographic regions can be provided for download to mobile devices 1002*a* and 1002*b*.

Location-CDMA identifier mapping service 1040 can determine one or more geographic regions associated with CDMA, and provide the one or more identifiers to mobile devices 1002*a* and 1002*b* for registration in association with a baseband subsystem.

Mobile device 1002*a* or 1002*b* can also access other data and content over the one or more wired and/or wireless networks. For example, content publishers, such as news sites, Rally Simple Syndication (RSS) feeds, web sites, blogs, social networking sites, developer networks, etc., can be accessed by mobile device 1002*a* or 1002*b*. Such access can be provided by invocation of a web browsing function or application (e.g., a browser) in response to a user touching, for example, a Web object.

Exemplary System Architecture

Figure 11:
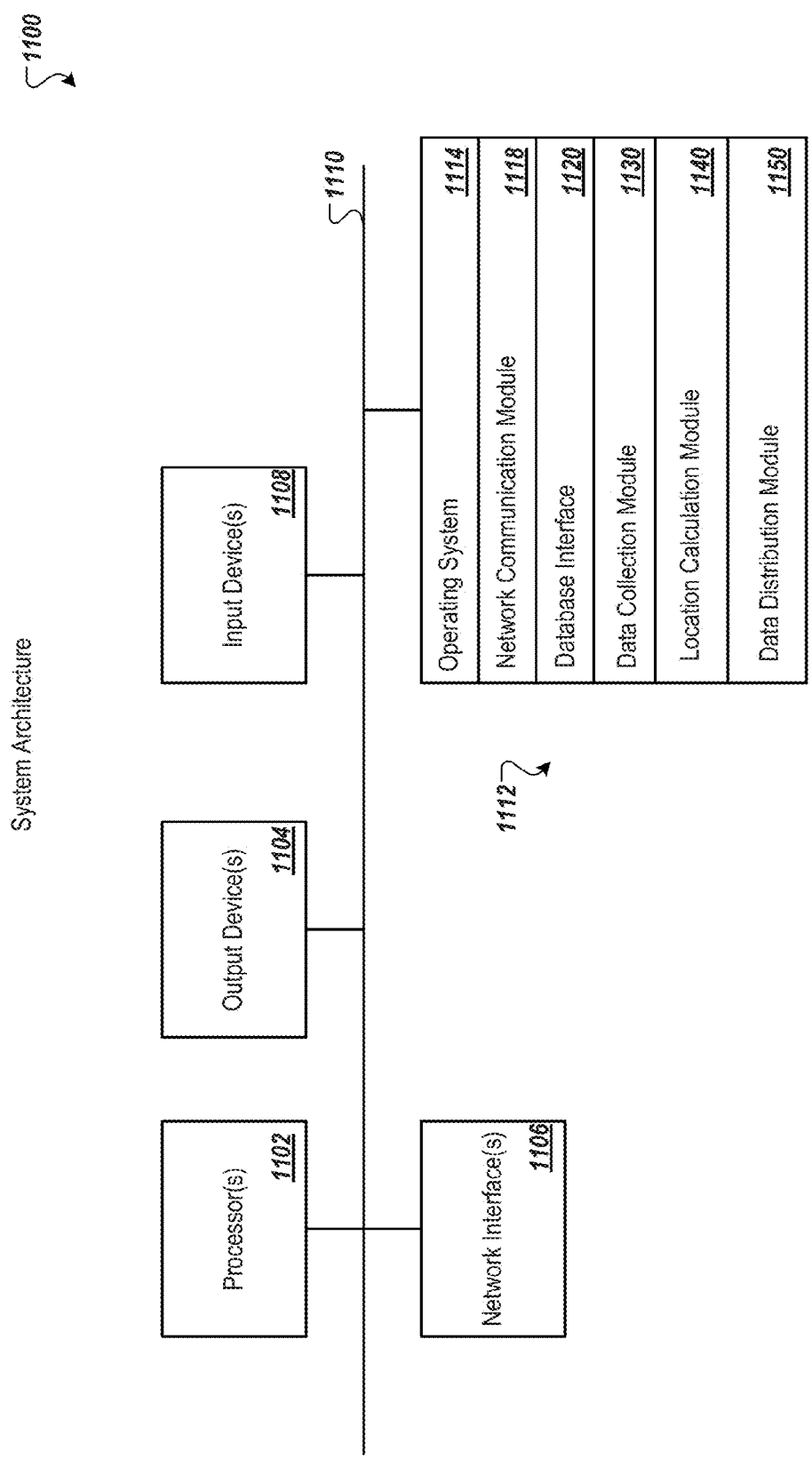
FIG. 11 is a block diagram of an exemplary system architecture for implementing the features and operations of multi-tiered geofence detection.

FIG. 11 is a block diagram of an exemplary system architecture for implementing the features and operations of multi-tiered geofence detection. Other architectures are possible, including architectures with more or fewer components. In some implementations, architecture 1100 includes one or more processors 1102 (e.g., dual-core Intel® Xeon® Processors), one or more output devices 1104 (e.g., LCD), one or more network interfaces 1106, one or more input devices 1108 (e.g., mouse, keyboard, touch-sensitive display) and one or more computer-readable mediums 1112 (e.g., RAM, ROM, SDRAM, hard disk, optical disk, flash memory, etc.). These components can exchange communications and data over one or more communication channels 1110 (e.g., buses), which can utilize various hardware and software for facilitating the transfer of data and control signals between components.

The term "computer-readable medium" refers to any medium that participates in providing instructions to processor 1102 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1112 can further include operating system 1114 (e.g., Mac OS® server, Windows® NT server), network communication module 1118, database interface 1120, data collection module 1130, location calculation module 1140, and data distribution module 1150. Data collection module 1130 can be configured to receive CDMA identifiers and location coordinates from mobile devices. Location calculation module 1140 can be configured to determine a location to be associated with each CDMA identifier. Data distribution module 1150 can be configured to distribute the CDMA identifiers and associated locations to mobile devices. Operating system 1114 can be multi-user, multiprocessing, multitasking, multithreading, real time, etc. Operating system 1114 performs basic tasks, including but not limited to: recognizing input from and providing output to devices 1106, 1108; keeping track and managing files and directories on computer-readable mediums 1112 (e.g., memory or a storage device); controlling peripheral devices; and managing traffic on the one or more communication channels 1110. Network communications module 1118 includes various components for establishing and maintaining network connections (e.g., software for implementing communication protocols, such as TCP/IP, HTTP, etc.). Database interface 1120 can include interfaces to one or more databases on a file system. The databases can be organized under a hierarchical folder structure, the folders mapping to directories in the file system. Data collection module 1130 can include components for collecting data from multiple mobile devices. Location calculation module 1140 can include one or more components for performing calculations on locations received from mobile devices. Data distribution module 1150 can perform various functions for transmitting location data in association with CDMA identifiers to various computing devices, including mobile devices.

Architecture 1100 can be included in any device capable of hosting a database application program. Architecture 1100 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, cells are represented as hexagons in the figures. The actual shape of a cell can vary.

What is claimed is:

1. A method, comprising:
   receiving, by a computer, a request from a mobile device, the request indicates that a task is to be triggered upon entry into a specified geographic region by the mobile device;
   determining, by the computer, a country in which the geographic region is located, wherein determining the country includes determining a mobile country code (MCC) of the country and a bounding box of the country, the bounding box being defined by extreme geographical points of the country;
   determining, by the computer, a first code division multiple access (CDMA) identifier for monitoring location of the mobile device, the first CDMA identifier being associated with a first CDMA location that intersects the specified geographic region, wherein the first CDMA location is determined using historical data;
   determining, by the computer, a second CDMA identifier for monitoring location of the mobile device, the second CDMA identifier being associated with a second CDMA location that intersects the specified geographic region, the second CDMA location being inside of the first CDMA location and having finer granularity than that of the first CDMA location; and
   providing geographic coordinates of the bounding box, the MCC, the first CDMA identifier, and the second CDMA identifier to the mobile device in response to the request.

2. The method of claim 1, wherein the extreme geographical points of the country includes at least one of a easternmost point of the country, a westernmost point of the country, a northernmost point of the country, or a southernmost point of the country.

3. The method of claim 1, wherein the historical data includes historical locations associated with the first CDMA identifier provided by one or more location-aware mobile devices.

4. The method of claim 1, wherein the first CDMA identifier includes at least one of a system identifier, a network identifier, or a zone identifier of a CDMA system.

5. The method of claim 4, wherein the second CDMA identifier includes a base station identifier of the CDMA system.

6. The method of claim 1, wherein the bounding box of the country includes one or more convex hulls of the country.

7. The method of claim 1, comprising determining the first CDMA location and second CDMA location based on the first CDMA identifier and the second CDMA identifier from a plurality of location-aware mobile devices and a location of each location-aware mobile device, each location being transmitted in association with a respective first CDMA identifier and second CDMA identifier by a location-aware mobile device to the computer.

8. A system comprising:
   one or more processors; and
   a non-transitory storage device storing instructions operable to cause the one or more processors to perform operations comprising:
      receiving, by a computer, a request from a mobile device, the request indicates that a task is to be triggered upon entry into a specified geographic region by the mobile device;
      determining, by the computer, a country in which the geographic region is located, wherein determining the country includes determining a mobile country code (MCC) of the country and a bounding box of the country, the bounding box being defined by extreme geographical points of the country;
      determining, by the computer, a first code division multiple access (CDMA) identifier for monitoring location of the mobile device, the first CDMA identifier being associated with a first CDMA location that intersects the specified geographic region, wherein the first CDMA location is determined using historical data;
      determining, by the computer, a second CDMA identifier for monitoring location of the mobile device, the second CDMA identifier being associated with a second CDMA location that intersects the specified geographic region, the second CDMA location being inside of the first CDMA location and having finer granularity than that of the first CDMA location; and providing geographic coordinates of the bounding box, the MCC, the first CDMA identifier, and the second CDMA identifier to the mobile device in response to the request.

9. The system of claim 8, wherein the extreme geographical points of the country includes at least one of a easternmost point of the country, a westernmost point of the country, a northernmost point of the country, or a southernmost point of the country.

10. The system of claim 8, wherein the historical data includes historical locations associated with the first CDMA identifier provided by one or more location-aware mobile devices.

11. The system of claim 8, wherein the first CDMA identifier includes at least one of a system identifier, a network identifier, or a zone identifier of a CDMA system.

12. The system of claim 11, wherein the second CDMA identifier includes a base station identifier of the CDMA system.

13. The system of claim 8, wherein the bounding box of the country includes one or more convex hulls of the country.

14. The system of claim 8, the operations comprising determining the first CDMA location and second CDMA location based on the first CDMA identifier and the second CDMA identifier from a plurality of location-aware mobile devices and a location of each location-aware mobile device, each location being transmitted in association with a respective first CDMA identifier and second CDMA identifier by a location-aware mobile device to the one or more processors.

15. A non-transitory storage device storing instructions operable to cause one or more processors to perform operations comprising:

receiving, by a computer, a request from a mobile device, the request indicates that a task is to be triggered upon entry into a specified geographic region by the mobile device;

determining, by the computer, a country in which the geographic region is located, wherein determining the country includes determining a mobile country code (MCC) of the country and a bounding box of the country, the bounding box being defined by extreme geographical points of the country;

determining, by the computer, a first code division multiple access (CDMA) identifier for monitoring location of the mobile device, the first CDMA identifier being associated with a first CDMA location that intersects the specified geographic region, wherein the first CDMA location is determined using historical data;

determining, by the computer, a second CDMA identifier for monitoring location of the mobile device, the second CDMA identifier being associated with a second CDMA location that intersects the specified geographic region, the second CDMA location being inside of the first CDMA location and having finer granularity than that of the first CDMA location; and providing geographic coordinates of the bounding box, the MCC, the first CDMA identifier, and the second CDMA identifier to the mobile device in response to the request.

16. The non-transitory storage device of claim 15, wherein the extreme geographical points of the country includes at least one of a easternmost point of the country, a westernmost point of the country, a northernmost point of the country, or a southernmost point of the country.

17. The non-transitory storage device of claim 15, wherein the historical data includes historical locations associated with the first CDMA identifier provided by one or more location-aware mobile devices.

18. The non-transitory storage device of claim 15, wherein the first CDMA identifier includes at least one of a system identifier, a network identifier, or a zone identifier of a CDMA system.

19. The non-transitory storage device of claim 18, wherein the second CDMA identifier includes g a base station identifier of the CDMA system.

20. The non-transitory storage device of claim 15, wherein the bounding box of the country includes one or more convex hulls of the country.

21. The non-transitory storage device of claim 15, the operations comprising determining the first CDMA location and second CDMA location based on the first CDMA identifier and the second CDMA identifier from a plurality of location-aware mobile devices and a location of each location-aware mobile device, each location being transmitted in association with a respective first CDMA identifier and second CDMA identifier by a location-aware mobile device to the one or more processors.

* * * * *

UNITED STATES PATENT AND TRADEMARK OFFICE
CERTIFICATE OF CORRECTION

PATENT NO. : 8,995,322 B2  
APPLICATION NO. : 14/165543  
DATED : March 31, 2015  
INVENTOR(S) : Ronald K. Huang, Morgan Grainger and Jason Dere Page 1 of 1

It is certified that error appears in the above-identified patent and that said Letters Patent is hereby corrected as shown below:

In the Claims

Column 20, Line 30 (Claim 19), after "includes" delete "g".

Signed and Sealed this  
Twenty-ninth Day of September, 2015

Michelle K. Lee  
*Director of the United States Patent and Trademark Office*